May 22, 1956  D. A. AUGUSTIN  2,746,557
POWER STEERING APPARATUS
Filed Jan. 12, 1953  2 Sheets-Sheet 1
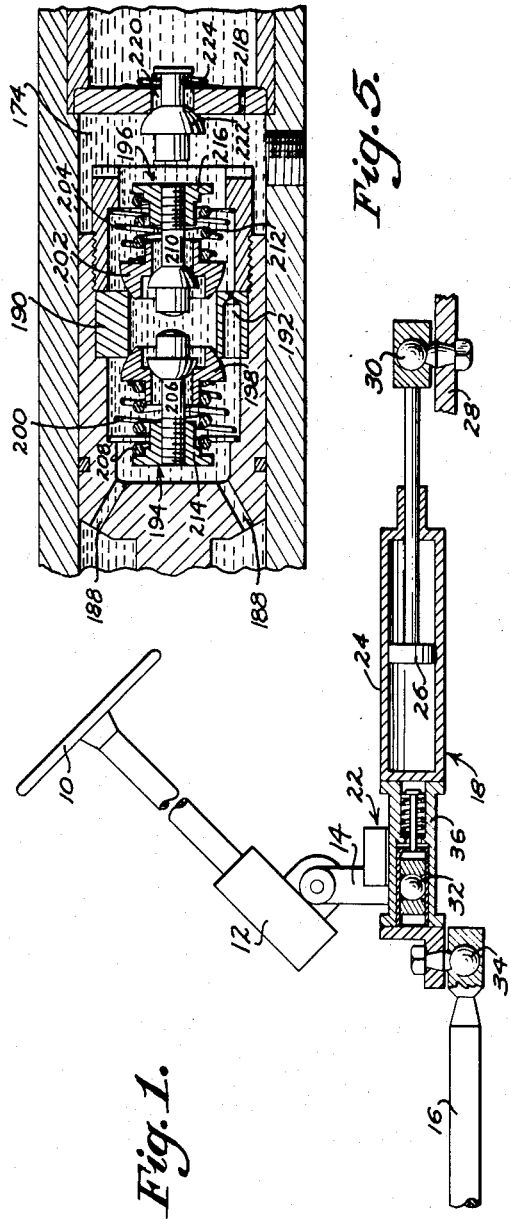
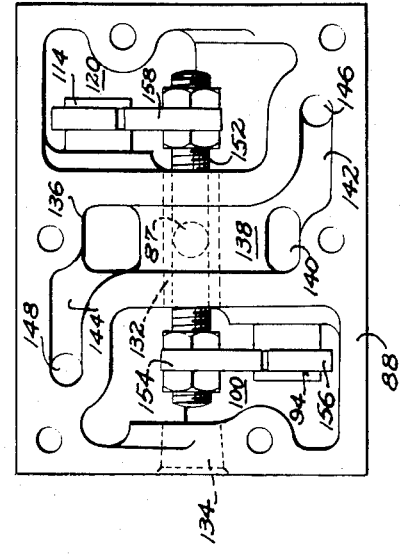
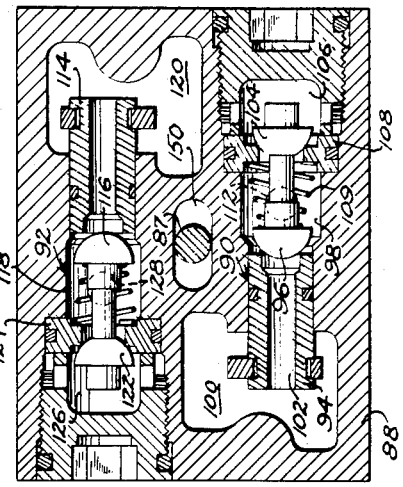
INVENTOR
Darold A. Augustin
BY
ATTORNEYS May 22, 1956  D. A. AUGUSTIN  2,746,557
POWER STEERING APPARATUS
Filed Jan. 12, 1953  2 Sheets-Sheet 2

INVENTOR
Darold A. Augustin
BY
ATTORNEYS

United States Patent Office 2,746,557
Patented May 22, 1956

2,746,557
POWER STEERING APPARATUS

Darold A. Augustin, Elyria, Ohio, assignor to Bendix-Westinghouse Automotive Air Brake Company, Elyria, Ohio, a corporation of Delaware Application January 12, 1953, Serial No. 330,798

8 Claims. (Cl. 180—79.2)

This invention relates to steering apparatus for the dirigible wheels of motor vehicles and more particularly to a novel power actuating mechanism which may be readily installed in the steering linkage of such motor vehicles for enabling manual and power steering thereof.

One of the important objects of the present invention is to provide a novel power steering apparatus for motor vehicles which is operated by fluid pressure and is capable of quick and ready installation in the present-day type of motor vehicle and which functions to effect power steering of the vehicle through operation of the conventional steering wheel.

Another object of the invention resides in the provision of a novel power steering actuator which incorporates a construction which enables manual steering of the vehicle during straightaway steering, where the steering resistance is relatively low, but which automatically steers the vehicle by power, when the resistance to steering reaches a predetermined value.

A further object is to provide a power steering mechanism of the foregoing character which is especially adapted for operation by compressed air and which includes a relatively simple but highly efficient valve mechanism for controlling the application of compressed air to the air motor, in accordance with the operation of the vehicle steering wheel.

A still further object comprehends a novel hydraulic dampening device which functions to prevent overtravel of the air motor as well as to prevent any tendency toward undesired reciprocation thereof due to road shocks which may be imparted to the power steering apparatus by the dirigible wheels and the linkages interposed between such wheels and the motor and controlling valve mechanism.

Still another object resides in the provision of a novel power steering unit, which is self-contained and which, when connected in the motor vehicle steering linkage, enables an efficient operation of the steering mechanism by manual effort up to a predetermined force, and by power, when such effort is exceeded.

Other objects and novel features of the invention will appear more fully hereinafter from a consideration of the following detailed description, when taken in connection with the accompanying drawings, which is illustrative of one form of the invention. It will be expressly understood, however, that the drawings are utilized for purposes of illustration only, and are not to be taken as a definition of the limits of the invention, reference being had for this purpose to the claims appended hereto.

Referring to the drawings, wherein similar reference characters refer to similar parts throughout the several views;

Fig. 1 is a diagrammatic view of a portion of a motor vehicle steering mechanism having the present invention incorporated therein;

Fig. 3 is a sectional view of the valve mechanism taken substantially along line 3—3 of Fig. 2;

Fig. 4 is a plan view of the valve mechanism with the housing cover removed and taken along line 4—4 of Fig. 2, and Fig. 5 is an enlarged axial sectional view of the hydraulic shock absorber of Fig. 2.

Figure 2:
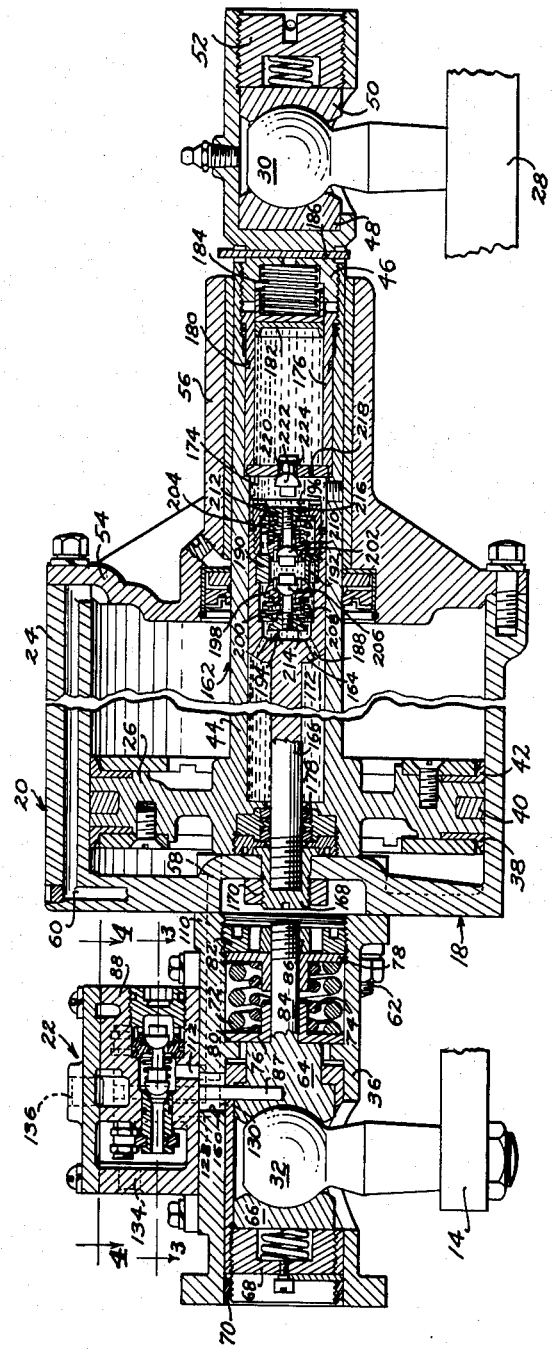
Fig. 2 is an axial sectional view of the power steering unit of the invention.

Referring more particularly to Fig. 1, the power steering mechanism of the present invention is illustrated therein as being associated with a conventional steering apparatus of a motor vehicle which includes a steering wheel 10, a steering box or gear assembly 12, an oscillatable steering arm or pitman 14 and a steering or drag link 16, the latter forming a part of the usual linkage for steering the dirigible wheels of the vehicle, not shown. The power steering actuator 18 of the present invention includes a power motor 20 and a valve mechanism 22 therefore, the motor comprising cylinder and piston elements 24 and 26 respectively, and the valve mechanism comprising an assembly to be described more fully hereinafter. Fig. 1 illustrates one manner of installation of the power actuator 18 wherein the piston 26 is stationary and is connected to a stationary part of the vehicle 28, as by means of a swivel stud 30. The valve mechanism 22 may be operated by a swivel stud 32, connected with the steering arm 14, and the manual and power steering effort may be imparted to the steering linkage of the vehicle through any suitable connections, which in the form shown, may include a swivel stud 34, carried by a casing 36, which in turn, may be fixed to the cylinder 24.

From the above, it will be seen that the installation of the power steering actuator 18 is relatively simple, it being only necessary to connect the piston 26 to a fixed part and to connect the valve mechanism 22 with a movable part of the steering mechanism, such as the steering arm 14, for example. The output of the actuator is of course, associated with a portion of the vehicle steering linkage, and in the present instance, such portion may be the drag link 16. However, the invention is not limited to the precise installation illustrated but may be incorporated in other positions which may be found convenient. It is only necessary that one of the power actuator elements, such as the piston 26 be connected to a stationary part and the valve mechanism be actuated by some part of the steering mechanism which is responsive to the manual control of the operator. The cylinder 24 may be connected to any suitable member of the steering mechanism such as the drag link or steering knuckle or other part. In other words, the power steering actuator of the invention is inserted, as it were, in the normally operated vehicle steering mechanism, with the valve mechanism operable by a manually operable part and the cylinder connected with an actuated part, and with the said parts being unconnected except through the power steering actuator of the invention.

The novel power actuator 18 is more particularly shown in Fig. 2, wherein the piston 26, provided with peripheral seals 38, 40 and 42, has a stationary, hollow piston rod 44 connected therewith which extends through the cylinder 24 and is suitably secured to the stationary swivel stud 30 as by means of a threaded sleeve 46, a pair of swivel seats 48, 50 and a nut 52. The cylinder 24 comprises a cylindrical body member which is closed by a head 54, the latter being provided with a sleeved extension 56 through which the piston rod 44 extends. In order to provide for the passage of compressed air to the cylinder 24 on opposite sides of the piston 26, the former is provided with suitable passages 58 and 60. As shown, the movable cylinder 24 is provided with an axial extension formed as the casing 36, securely connected to the left end of the cylinder as by means of studs 62, the casing 36 forming the output end of the power motor 20 and being connected in any suitable manner, such as by the connections illustrated in Fig. 1, with the part to be steered.

In order to control the flow of compressed air to and from the cylinder 24, the present invention provides the novel valve mechanism 22 which is arranged to be operated through movement of the swivel stud 32 in response to manual operation of the steering wheel 10 and the steering arm 14. The association of the stud 32 and the valve mechanism 22 is moreover such that a predetermined resistance which is proportional to the steering effort, is incorporated, such resistance being effective in either direction of movement of the steering mechanism and being constructed in such manner that the valve mechanism 22 does not operate until a predetermined steering effort has been exerted. More particularly, the stud 32 is confined between seats 64 and 66, the latter being maintained in the position shown through a nut 68 which is threadedly received within a sleeve 70 which is slidable within the casing 36. The other seat 64 is maintained in the position shown, as by means of a pair of precompressed springs 72 and 74 which are confined between spring seats 76 and 78. The seat 76 normally bears against a shoulder 80 of the casing 36 while the seat 78 normally contacts a nut 82 carried by the casing 36. A threaded extension 84 of the seat 64 is adapted to receive a nut 86 which may be adjusted in order to vary the precompression of the springs 72 and 74. From this construction, it will be readily perceived that since operation of the valve mechanism 22 depends upon relative movement of the swivel stud 32 and the casing 36, the valve actuating member 87 being secured to the stud seat 64, no such relative movement will occur until the precompressed springs 72 and 74 are compressed a predetermined amount. In other words, when the resistance to steering is less than the force required to compress the springs 72 and 74, as would be the case in straightaway steering, for example, the manual steering effort from the stud 34 will be transmitted through the springs to the abutments comprising the shoulder 80 or the nut 82, depending upon the direction of steering, and manual steering of the vehicle through the casing 36 and connected steering parts, will result. During this operation, the valve mechanism 22 will not be operated and the cylinder 24 will move with the casing 36 in response to the manually applied steering force. However, in the event the steering resistance is such that the steering effort compresses the springs 72 and 74 so as to effect a relative movement between the stud seat 64 and the casing 36, then the valve mechanism 22 will function to supply compressed air to the proper cylinder space in order to move the cylinder 24 and parts connected thereto, in the proper direction in order that power steering of the vehicle may be obtained.

The valve mechanism 22 is more particularly shown in Figs. 2, 3 and 4 and includes a casing 88, secured to the casing 36, and in which a pair of similar valve devices 90, 92 is housed. The valve device 90, for example, includes a valve plunger 94 which is adapted, upon movement to the right to contact an exhaust valve 96 in order to close communication between an outlet chamber 98 and an exhaust chamber 100 by way of passage 102 formed in the plunger 94. Further movement of the plunger 94 to the right opens an inlet valve 104 in order to connect the outlet chamber 98 with an inlet chamber 106. In the position shown in Figs. 2 and 3, the inlet valve 104 is closed against its seat 108 by a spring 109 and the outlet chamber 98 is connected to the exhaust chamber 100. Thus, the passage 60 of the cylinder 24 which is connected to the outlet chamber 98 by way of passages 110 and 112 is connected with the exhaust chamber 100. However, when the inlet valve 104 is opened, in the manner indicated above, the passage 60 is connected to the inlet chamber 106 by way of passages 110 and 112. In the exhaust position, the space to the right of the piston 26 is exhausted to atmosphere. With the intake valve 104 open, such space is charged with compressed air in order to move the cylinder 24 and the parts connected thereto, to the right.

In like manner, the valve device 92 includes a valve plunger 114 which cooperates with an exhaust valve 116 to close communication between an outlet chamber 118 and an exhaust chamber 120. An inlet valve 122, when moved off its seat 124, connects the outlet chamber 118 with an inlet chamber 126 in order to supply the passage 58 and hence the cylinder space to the left of the piston 26, with air under pressure by way of passages 128 and 130. In the exhaust position, the space to the left of the piston 26 is exhausted to atmosphere. With the intake valve 122 open, such space is charged with compressed air in order to move the cylinder 24 and the parts connected thereto, to the left.

As shown more particularly in Figs. 2 and 4, the exhaust chambers 100 and 120 are in communication through a passage 132 formed in the casing 88 and an exhaust opening 134 connects the chamber 100 with the atmosphere. An inlet opening 136, which is connected with a supply of compressed air, not shown, conducts compressed air to the inlet chambers 106 and 126 at all times, by way of cored passages, 138, 140, 142 and 144, the passages 142 and 144 terminating in openings 146 and 148 which respectively communicate with said inlet chambers 106 and 126.

In order to operate the valve devices 90 and 92 in accordance with steering movements of the steering arm 14, the valve actuating member 87 extends through an elongated slot 150 in the valve casing 88 and its upper end is secured to a valve actuating rod 152, see Figs. 2 and 4. One end of the rod 152 has secured thereto, a valve actuating arm 154 which is provided with a forked end 156 which is secured to the valve plunger 94. In like manner, the opposite end of the valve actuating rod 152 has a valve actuating arm 158 secured thereto and the opposite end thereof is forked and engages the valve plunger 114, this construction being more fully disclosed in Figs. 3 and 4. As shown in Fig. 2, the casing 36 is provided with a slot 160 in order to allow some relative movement between the said casing and the valve actuating member 87 in order to operate the valve device 90 and 92 for the purpose of providing power operation of the vehicle steering mechanism, in a manner which will appear more fully hereinafter.

One of the important features of the present invention resides in the provision of an arrangement for preventing overcontrol of fluid pressure in the power motor 20 due to road shocks to which the power steering unit may be subjected by reason of irregularities in the road bed. For this purpose, the invention includes a hydraulic shock absorber or dampener 162, the same including a hydraulic piston 164 formed integrally with or otherwise secured to a rod 166 which is secured at its left hand end to the cylinder 24 by means of a cap 168 and a nut 170. The piston 164 snugly fits the interior of the hollow piston rod 44 and divides the space within such hollow piston rod into a pair of spaces 172 and 174 disposed respectively at the left and right of the piston 164. Spaces 172 and 174 are filled with a suitable shock absorber liquid and a compensator chamber 176 secured to the piston rod 44 adjacent the right hand end thereof is also filled with the shock absorber liquid and such liquid is confined in the spaces just described by seals 178 and 180. The shock absorbing liquid is also confined against leakage within the chamber 176 as by means of a sealing cup 182, such cup being acted upon by a light spring 184 which is interposed between the cup and the end 186 of the sleeve 46. With this construction it will be readily understood that upon movement of the cylinder 24 in opposite directions with respect to the piston 26, the rod 166 and the shock absorber piston 164 moves with said cylinder in the spaces 172 and 174 within the hollow piston rod 44.

The construction of the dampening device 162 is such that during normal steering the shock absorbing liquid can pass through the device from one side to the other without appreciable back pressure being built up. To this end, the piston 164 is provided with a plurality of openings 188 and a valve seat 190, the latter being provided with a restriction or choke 192 which allows liquid to pass between the spaces or chambers 172 and 174 without appreciable resistance during normal steering movements of the vehicle steering apparatus.

In order to control the damping action, the dampening device 162 inlcudes a pair of similar valve devices 194 and 196. The valve device 194 for example, includes a valve 198 which is maintained in engagement with the seat 190 by means of a relatively light spring 200. In like manner, the valve device 196 includes a valve 202 which is normally held on to its seat by a relatively light spring 204. Each of the aforesaid valve devices includes a pressure limiting valve and in the case of valve 194 such limiting valve is shown at 206 and is maintained against its seat formed in the valve 198 as by means of a relatively strong spring 208. In the case of the valve device 196, the pressure limiting valve is shown at 210 and is maintained against its seat formed on the valve 202 as by means of a relatively strong spring 212.

It will be observed that the spring 208 is confined between the valve 198 and an adjustable nut 214 so that any desired degree of preloading of the spring 208 may be obtained by adjustment of the nut 214 with respect to the valve 206. In this manner, the force required to open the valve 206 may be predetermined by preloading the valve spring 208 to the desired value. In like manner, the spring 212 of the valve device 196 is confined between the valve 202 and an adjusting nut 216 and the adjustment of said nut will predetermine the preloading of the spring 212 and consequently the force required for opening the valve 210.

From the above construction, it will be readily perceived that during normal steering operations, the shock absorbing liquid may freely pass from one side of the piston 164 to the other through the orifice or choke 192 without offering any appreciable resistance to the steering operation. However, in the event that a road shock is encountered which tends to impart a higher velocity to the piston 164 and parts connected thereto, it will be understood that a rise in pressure will be developed upon one side of the choke 192 or the other, depending upon the direction of steering. In the event that such pressure rise is developed during steering movement of the cylinder 24 toward the left as viewed in Fig. 2, such pressure will act upon the pressure limiting valve 206 in a direction tending to move the said valve off its seat. When such pressure reaches the value determined by the degree of preloading of the spring 208, the valve 206 will open and the fluid pressure will open the valve 202, against the action of the relatively light spring 204 and fluid will flow to the space 174 at the right of the piston 164. Thus, the road shock will be opposed by an abrupt rise in resistance, through the pressure differential built up across the choke 192 following which the increase in pressure will be dissipated through operation of the pressure limiting valve 206, and such action will prevent overcontrol of the compressed air delivered to the power motor 20 which might otherwise be caused by undesired operation of the valve mechanism 22 in accordance with the road shock in the steering aparatus.

In like manner and in the event that the steering movement is in the opposite direction, a rise in pressure in the chamber or space 174 due to a road shock will cause an abrupt rise in resistance to movement of the shock absorber piston 164. When the pressure within the space 174 reaches a predetermined value, as determined by the degree of precompression of the spring 212 the pressure limiting valve 210 will open and the valve 198 will thereafter open in order to bypass the shock absorbing liquid from the space 174 to the space 172. Here again, any tendency toward overtravel of the power motor 20 due to undesired operation of the valve mechanism 22 due to the road shock, is prevented, due to the abrupt rise in resistance to movement of the shock absorber piston 164 which is rigidly connected to the cylinder 24 of the motor 20.

In order to compensate for the variable displacement of the chambers 172 and 174, due to the fact that the former chamber includes the rod 166, the compensator chamber 176 is provided. The interior of this chamber is, as heretofore stated, filled with the shock absorber liquid and communicates at all times with the space 174 through an orifice 218 which is slightly smaller than the choke 192. The liquid within the chamber 176 is under a slight pressure at all times by means of the relatively light spring 184 acting upon the sealing cup 182 and the opposite end of the chamber 176 is provided with an opening 220 which is normally closed by a valve 222 which is acted upon by a relatively light spring 224. With such an arrangement, it will be readily understood that in the event the steering movement is in a direction to move the shock absorber piston 164 to the left, a slight pressure differential force will be created across the orifice 218 and the valve 222 will be opened to allow liquid to flow from the chamber 176 into the space 174. Thus the compensator chamber 176 compensates for the differences in area on opposite sides of the shock absorber piston 164 during the steering operations.

In operation, it will be understood that when the steering wheel 10 is in its central position, the piston 26 will occupy the central portion of the cylinder 24. In the event that the steering wheel 10 is turned in one or the other direction, and the resistance to steering is less than the force required to compress the precompressed springs 72 and 74, the steerable wheels of the vehicle will be steered wholly by manual effort. In such operation, the manual steering force will be exerted through the swivel stud 32 and through the springs 72 and 74 directly to the casing 36 through either the shoulder 80 or the nut 82, depending of course upon the direction of steering. Under these conditions, the casing 36, the valve mechanism 22 and the cylinder 24 will move as a unit in order to convey the manual steering effort to the steering member 16 and thus manually steer the vehicle. During this operation, and as heretofore described in detail, the shock absorbing liquid in the spaces or chambers 172 and 174 will pass from one side to the other of the shock absorbing piston 164 through the choke 192 without offering any appreciable resistance to the steering operation.

In the event however that the force required for steering is greater than the degree of precompression of the springs 72 and 74, power operation of the vehicle steering apparatus will take place. In such case, the vehicle is steered by combined manual effort and powger operation. For example, should the steering movement be such that the stud 32 is moved to the right, as viewed in Figs. 1 and 2, the spring seat 76 will also be moved to the right with respect to the casing 36 and the springs 72 and 74 will be compressed above their initial preloading. Since the valve actuating member 87 is connected with the seat 64, it will be readily understood that during such relative movement between the said seat and the casing 36, the valve actuating rod 152 and parts connected thereto will be moved to the right, as viewed in Figs. 3 and 4. Such movement however will only serve to move the valve plunger 114 further to the right as viewed in Fig. 3. However the valve actuating arm 154 will move the valve plunger 94 of the valve device 90 to the right and will first close the exhaust valve 96 and then open the inlet valve 104. Compressed air will thereupon be conducted from the inlet 136 to the space within the cylinder 24 at the right hand side of the piston 26 by way of passages 138, 140, 142, 146, inlet chamber 106, outlet chamber 98 and passages 112 and 60. Since the piston 26 is connected to a stationary part 28 of the vehicle, it will be readily understood that under the stated conditions, the cylinder 24 and parts connected thereto will be moved to the right as viewed in Figs. 1 and 2. This will effect a steering movement of the steering member 16 to the right, see Fig. 1, and this operation will continue until the manually applied steering force is arrested. As soon as this condition occurs, the overtravel of the cylinder 24 will effect a closing of the inlet valve 104 and the valve device 90 is then in its lapped position and further supply of compressed air to the cylinder is cut off.

Steering movement of the stud 32 in the opposite direction will effect an opening of the inlet valve 122 of the valve device 92 due to the relative movement between the stud 34 and the casing 36 as the springs 72 and 74 are compressed. The opening of the inlet valve 122 is effected by movement of the valve actuating member 87, the rod 152 and the arm 158 which is connected to the valve plunger 114. Upon opening of the inlet valve 122, compressed air will be delivered to the space at the left side of the stationary piston 26 by way of connections 136, 144, 148, 128, 130 and 58. As soon as this occurs, the cylinder 24 and parts connected thereto will be moved to the left, as viewed in Figs. 1 and 2, in order to correspondingly move the steering connection 16. As soon as the manually applied steering effort ceases and the stud 32 is stationary, the overtravel of the cylinder 24 and parts connected thereto will effect a closing of the valve 122 which then occupies a lapped position and further application of compressed air to the cylinder 24 is cut off. As in the previous case, the shock absorbing fluid will readily pass from one side of the shock absorbing piston 164 to the other without any appreciable resistance being offered to the steering operation.

In the event however that the steerable wheels of the vehicle are subjected to a road shock of sufficient magnitude that there is a tendency to impart a greater than normal velocity of movement to the shock absorber piston 164, the increased displacement of fluid will abruptly build up a pressure upon one or the other side of the choke 192. In such event, the abrupt increase in pressure will prevent overcontrol of compressed air in the cylinder 24 which might otherwise occur due to operation of the valve mechanism 22 in response to the road shock. When the resistance to the shock reaches a predetermined value, as determined by the preloading of the springs 208 or 212, respectively associated with the pressure limiting valves 206 and 210, the pressure will be relieved in the manner heretofore described in detail. Thus, due to the provision of the novel shock absorbing mechanism 162 and the compensating chamber 176, any tendency toward overtravel of the steering cylinder 24 due to undesired operation of the valve mechanism 22 is avoided and undesirable reciprocation of the cylinder which might cause shimmy of the steering apparatus is eliminated.

It will be readily understood from the above, that the present invention provides a novel, compact and highly efficient power steering apparatus which may be readily installed in the steering linkage of the vehicle and which secures the highly desirable power assist of the steering operation when the resistance to steering reaches a predetermined value. The construction is also such that efficient manual control is exercised at all times and manual steering is always possible, even in the event of a power failure. The novel valve mechanism utilized is of the follow-up type so that the degree of power operation is always under the control of the operator.

While one embodiment of the invention has been shown and described herein, with considerable particularity, it will be understood by those skilled in the art that various modifications may be resorted to without departing from the spirit of the invention. Reference will therefore be had to the appended claims for a definition of the limits of the invention.

What is claimed is:

1. In a power steering mechanism for vehicles of the type having a manually operable steering member and a steering linkage operatively connected with the steerable wheels of the vehicle, a fluid pressure operated actuator having a pair of relatively movable elements for operating said linkage, one of said elements being connected with a fixed member of the vehicle, means connecting the other element with the linkage whereby when said actuator is energized said steerable wheels are steered by power, and means connecting said linkage and said steering member and including a valve mechanism for controlling the application of fluid pressure to said actuator whereby the steerable wheels may be moved manually or by the combination of manual and power effort, comprising a casing operatively connected with said linkage, a valve housing supported on said casing, said valve mechanism being positioned within said housing, a swivel link connected to said steering member and having a ball-shaped end positioned within said casing, means mounting said ball-shaped end in said casing for slight relative movement longitudinally thereof including a swivel seat on opposite sides of said end of said link, said casing being provided with an enlarged opening, a valve actuating pin carried by one of said seats and extending laterally thereof and through said enlarged opening into the valve housing and movable laterally in said enlarged opening to operate said valve mechanism during said slight relative movement of said one swivel seat and said casing, a pair of spaced-apart abutments carried by said one swivel seat, a second pair of spaced-apart abutments carried by said casing and a precompressed spring confined between the respective pairs of abutments for normally preventing said relative movement for enabling steering operation of said wheels by manually applied power only, up to the point where the manually applied effort exceeds the degree of precompression of said spring.

2. In a power steering mechanism for vehicles of the type having a manually operable steering member and a steering linkage operatively connected with the steerable wheels of the vehicle, a fluid pressure operated actuator having a cylinder and a piston therein, a hollow piston rod adapted to be connected with a fixed member of the vehicle, means connecting the cylinder with said linkage whereby when said actuator is energized by fluid pressure said steerable wheels are steered by power, means connecting said linkage and said steering member and including a valve mechanism for controlling the application of fluid pressure to said actuator whereby the steerable wheels may be moved manually or by the combination of manual and power effort, means including a precompressed spring interposed between said steering member and linkage and compressible when the resistance to steering of said wheels exceeds the degree of precompression of said spring to allow actuation of said valve mechanism by movement of said steering member, and a hydraulic dampening device for preventing operation of said valve mechanism due to road shock imparted to said connecting means, said device including a dampening piston connected with said cylinder and movable within said hollow piston rod and dividing the space within said rod into a pair of chambers adapted to be filled with a damping liquid, means carried by said dampening piston to establish a restricted communication between said chambers, and a pair of pressure limiting valves carried by said dampening piston for establishing free communication between said chambers in response to a predetermined pressure differential built up across said last named means due to increased velocity of movement of said cylinder and dampening piston in either direction due to road shock.

3. In a power steering mechanism for vehicles of the type having a manually operable steering member and a steering linkage operatively connected with the steerable wheels of the vehicle, a fluid pressure operated actuator having a pair of relatively movable elements for operating said linkage, one of said elements being connected with a fixed member of the vehicle, means connecting the other element with the linkage whereby when said actuator is energized said steerable wheels are steered by power, means connecting said linkage and said steering member and including relatively movable parts, resilient means for normally preventing relatively movement of said parts when the resistance to steering of said wheels is relatively low, valve means operable during relative movement of said parts upon compression of said resilient means when the resistance to steering of said wheels exceeds a predetermined value for controlling the application of fluid under pressure to said actuator, and a hydraulic dampening device for preventing operation of said valve means due to road shock imparted to said connecting means, said device including a stationary housing filled with a damping liquid, a dampening piston movable with said other element of the actuator and positioned within said housing and dividing the latter into two liquid-filled chambers, means carried by the piston and establishing a restricted communication between said chambers and allowing relatively free flow of liquid between said chambers during relative movement of the elements of said actuator during normal steering operations and building up a relatively high pressure to oppose movement of the dampening piston and relative movement of the elements of said actuator due to road shocks imparted to said connecting means which tend to increase the velocity of movements of said dampening piston and said other element of said actuator, said valve means responsive to a predetermined pressure differential built up across the restricted communication to establish a supplemental communication between said chambers.

4. A power steering mechanism as set forth in claim 3 which comprises in addition, a compensating cylinder secured within the housing and filled with said damping liquid, means for establishing free communication between the compensating cylinder and one of said chambers, and means to maintain the liquid in said compensating cylinder under a relatively light pressure at all times.

5. A power steering mechanism as set forth in claim 4 which comprises in addition, a passage connecting said compensating cylinder and said one chamber, and a spring-closed valve controlling said passage.

6. In a power steering mechanism for vehicles of the type having a manually operable steering member and a steering linkage operatively connected with the steerable wheels of the vehicle, a fluid pressure operated actuator having a cylinder and a piston therein, a hollow piston rod connected with the piston and adapted to be connected with a fixed member of the vehicle, means connecting the cylinder with said linkage whereby when said actuator is energized by fluid pressure said steerable wheels are steered by power, means connecting said linkage and said steering member and including a valve mechanism for controlling the application of fluid pressure to said cylinder whereby the steerable wheels may be moved manually or by the combination of manual and power effort, means including a precompressed spring interposed between said steering member and linkage and compressible when the resistance to steering of said wheels exceeds the degree of precompression of said spring to allow actuation of said valve mechanism by movement of said steering member, and a hydraulic dampening device for preventing operation of said valve mechanism due to road shock imparted to said connecting means, said device including a dampening piston positioned within said hollow piston rod and dividing the space within said rod into a pair of chambers adapted to be filled with a damping liquid, a rod connecting said dampening piston and cylinder and passing through one of said chambers, means carried by the dampening piston and establishing a restricted communication between said chambers and allowing relatively free flow of liquid therebetween during normal movement of said cylinder during normal steering operations and building up a relatively high pressure to oppose movements of the dampening piston and the cylinder due to road shocks imparted to said connecting means which tend to increase the velocity of movements of said dampening piston and cylinder, a compensating cylinder secured within the hollow piston rod and positioned within the other of said chambers and being filled with said damping liquid, means for establishing communication between said compensating cylinder and said other of the chambers, and means to maintain the liquid in said compensating cylinder under a relatively light pressure at all times.

7. A power steering mechanism as set forth in claim 6 which comprises in addition, valve means responsive to a predetermined pressure differential built up across the restricted communication to establish a supplemental communication between said chambers.

8. A power steering mechanism as set forth in claim 6 wherein the means for establishing communication between the compensating cylinder and said other of the chambers includes a part which is smaller than said restricted communication.

References Cited in the file of this patent

UNITED STATES PATENTS

| | | |
|---|---|---|
| 1,874,248 | Davis | Aug. 30, 1932 |
| 2,022,698 | Vickers | Dec. 3, 1935 |
| 2,193,989 | Carter et al. | Mar. 19, 1940 |
| 2,368,741 | Bowling | Feb. 6, 1945 |
| 2,385,485 | Baade | Sept. 25, 1945 |
| 2,450,126 | Fisher | Sept. 28, 1948 |
| 2,487,618 | Twyman | Nov. 8, 1949 |
| 2,565,929 | Onde | Aug. 28, 1951 |

FOREIGN PATENTS

| | | |
|---|---|---|
| 654,269 | Great Britain | June 13, 1951 |